United States Patent [19]

Bergles

[11] 4,416,646
[45] Nov. 22, 1983

[54] BICYCLE CHAIN-SHIFTING DEVICE
[75] Inventor: Eduard Bergles, Graz, Austria
[73] Assignee: Fichtel & Sachs AG, Schweinfurt, Fed. Rep. of Germany
[21] Appl. No.: 252,950
[22] Filed: Apr. 10, 1981
[30] Foreign Application Priority Data Apr. 10, 1980 [DE] Fed. Rep. of Germany ....... 3013854

[51] Int. Cl.³ ............................ F16H 7/22; F16C 1/10
[52] U.S. Cl. .................................. 474/80; 74/501.5 R
[58] Field of Search ....................... 474/78, 79, 80, 81, 474/82; 74/501.5

[56] References Cited

U.S. PATENT DOCUMENTS

| | | | |
|---|---|---|---|
| 3,890,847 | 6/1975 | Dian | 474/80 |
| 3,903,751 | 9/1975 | Dian | 474/82 |
| 3,943,794 | 3/1976 | Shimada | 74/501.5 R |
| 4,066,154 | 1/1978 | Ross | 74/501.5 R |
| 4,231,264 | 11/1980 | Bergles | 474/80 |
| 4,305,711 | 12/1981 | Lannoch | 474/82 |

FOREIGN PATENT DOCUMENTS

| | | | |
|---|---|---|---|
| 2459341 | 7/1976 | Fed. Rep. of Germany | 474/82 |
| 2827742 | 1/1979 | Fed. Rep. of Germany | 474/80 |
| 2739543 | 3/1979 | Fed. Rep. of Germany | 474/80 |
| 7409288 | 2/1976 | France | 74/501.5 |

Primary Examiner—Lawrence J. Staab
Assistant Examiner—Michael D. Bednarek
Attorney, Agent, or Firm—Toren, McGeady and Stanger

[57] ABSTRACT

In a chain-shifting device for a bicycle or the like a fixed support member is to be attached to the frame of the bicycle. A movable support member is mounted on said fixed support member by guide means so as to be movable with respect to said fixed support member by said guide means along a path of movement. A chain mover unit is mounted on said movable support member. First spring means are provided for biasing said movable support member towards one end of said path of movement. An adjusting switch is provided which is also to be attached to a part of the bicycle. This adjusting switch is capable of a plurality of switch positions. One terminal of said switch positions corresponds to said one end of said path of movement and is defined by switch stop means. Transmission means extend between said adjusting switch and said movable support member for positioning said movable support member along said path of movement against the action of said first spring means. The transmission means comprise an automatic compensating means for compensating for a change of the effective length of said transmission means so as to readjust in operation a predetermined position of said mover unit when said adjusting switch is in said terminal position even when a change of the effective length of the transmission means has occurred. The compensating means are such to continuously compensate for changes of the effective length of the transmission means. In view of this the compensating means comprise first and second compensating members which are a part of the transmission means and are interconnected by a clamp roller free-wheel unit. One of said compensating members engages an abutment member when a change of the effective length of the transmission means has occurred so that said compensating members are moved with respect to each other in a direction of movement permitted by said free-wheel unit so as to effect the compensation of the change of effective length of the transmission means.

13 Claims, 11 Drawing Figures

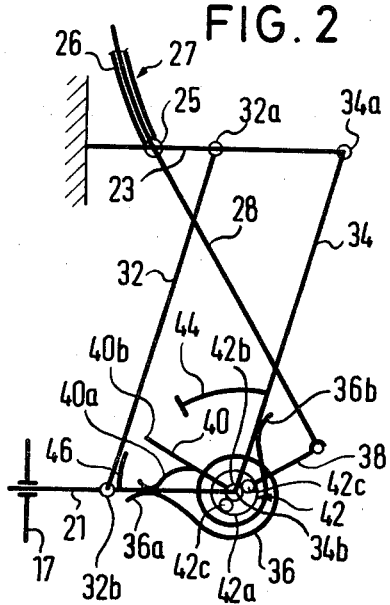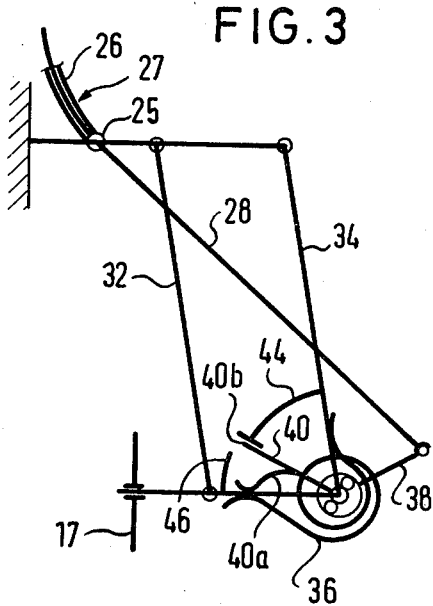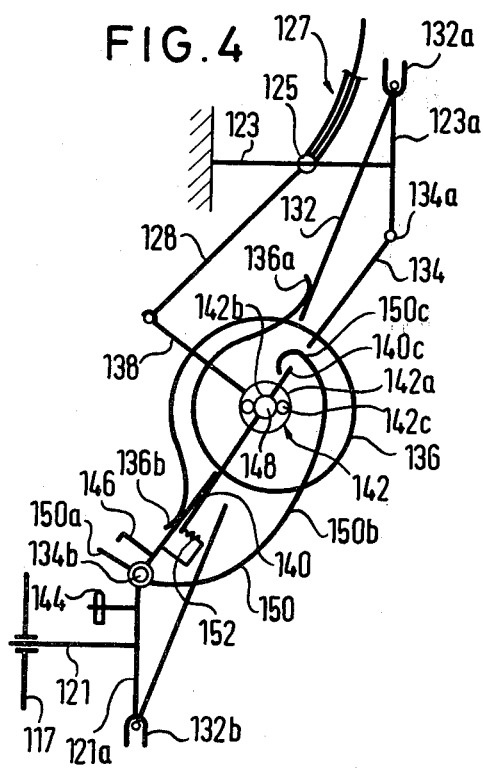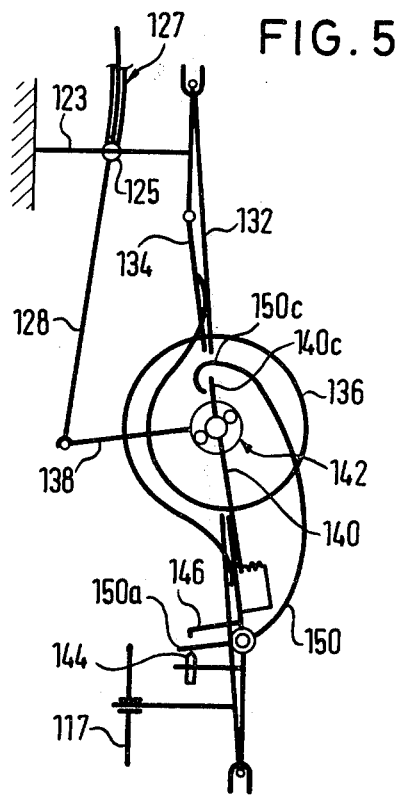

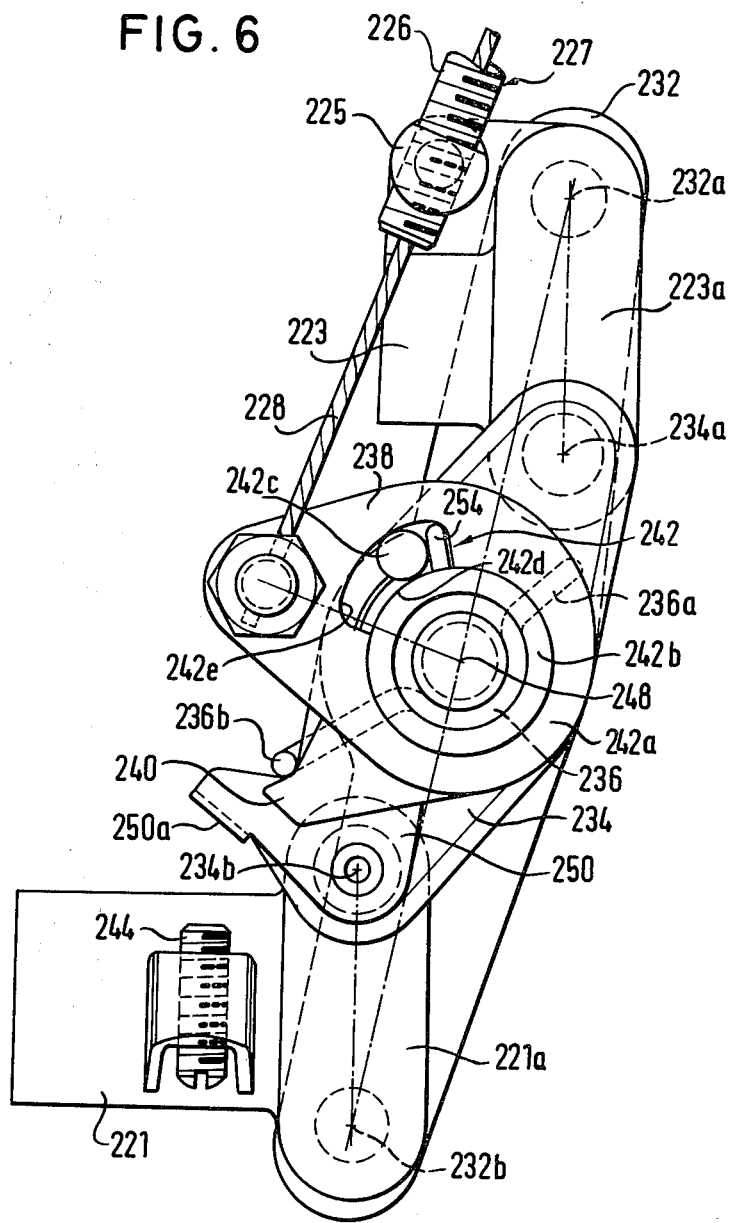

BICYCLE CHAIN-SHIFTING DEVICE

SUMMARY OF THE INVENTION

The present invention is directed to a chain-shifting device for a bicycle or the like comprising a chain mover unit, a movable support member supporting said chain mover unit, a fixed support member to be attached to the frame of the bicycle, guide means supported on said fixed support member, said movable support member being guided by said guide means for movement along a path of movement with respect to said fixed support member. First spring means are provided for biasing said movable support member towards one end of said path of movement. An adjusting switch including a switch housing and an operating member is provided also for attachment to a part of the bicycle. The operating member is capable of a plurality of switch positions with respect to said switch housing. A terminal one of said switch positions corresponds to said one end of said path of movement and is defined by switch stop means. Transmission means extend between the operating member and the movable support member so that said movable support member can be positioned along said path of movement by said operating member against the action of said first spring means. The transmission means comprise a pulling member, e.g. the core of a Bowden cable and automatic compensating means for compensating for a change of the effective length of said transmission means so as to readjust in operation a predetermined position of said mover unit when said operating member is in said terminal position even when a change of the effective length of the transmission means has occurred.

Such a chain-shifting device is disclosed in German Offenlegungsschrift No. 28 27 742. In this known device there is provided an additional spring for continuously maintaining the transmission means under tension. The adjustability is based on ratchet means which permit a compensation of a change of the effective length only when the change of the effective length has exceeded a certain minimum value. Therefore it is not possible to continuously readjust the transmission means for compensating for even small changes of the effective length.

It is therefore the primary object of the present invention to provide an automatic and continuous compensation for changes of the effective length of the transmission means. Further objects of the present invention are to provide a relatively simple design consisting of a small number of components to facilitate assembling of the device and mounting of the device to the bicycle and to facilitate the service of the device even by unskilled persons.

In accordance with the present invention the compensating means comprise a first compensating member and a second compensating member connected to a first section and a second section of said transmission means respectively, and rotatably mounted with respect to each other about an axis of rotation, a clamp roller free-wheel unit being provided between said first and said second compensating members such as to lock said compensating members with respect to each other in a first relative rotational direction for allowing transmission of a pulling force through said transmission means and to allow relative rotation of said compensating members in a second rotational direction for compensating for a change of the effective length of said transmission means. Further, a first abutment member is operationally connected to one of said compensating members and a second abutment member is operationally connected to a part of said device which is movable with respect to said one compensating member during movement of said movable support member along said path of movement such that said abutment members engage each other when said movabale support member approaches said one end of said path of movement, such engagement effecting relative rotation of said compensating members in said second rotational sense when a change of the effective length of said transmission means has occurred.

The design of the present invention is particularly applicable to such chain-shifting devices in which the operating member is movable to different switch positions even when said chain mover unit is blocked by a non-rotating chain so that said transmission means are released from the spring force of said first spring means on such movement of said operating member. In such case it might happen that said compensating members are unintentionally moved with respect to each other so that the adjustment of the device is lost. For preventing this second spring means may be provided for maintaining said compensating members in mutually locked condition even when the transmission means are released from the spring force of said first spring means. The force of said second spring means may be smaller than the force of said first spring means.

The chain-shifting device of this invention may be adjusted by making one of said first and second abutment members adjustable, e.g. in the form of a set screw. No further adjustment means are necessary. One can however provide terminal abutment means on parts of the device, which are movable with respect to each other during said path of movement of the movable support member, said terminal abutment means coming into engagement only after said operating member has reached said terminal position defined by said switch stop means and when a change of the effective length of said transmission means has occurred and only after said first abutment member and said second abutment member have come into engagement. These terminal abutment means prevent the movable support member from excessive movement when the transmission means are broken or elongated to an excessive extent. These additional terminal abutment means are however not a basic feature of this invention. Moreover at least part of said terminal abutment means may consist of one of said first or second abutment members.

It is not necessary that all switch positions of the adjusting switch are defined by particular arresting means. It is however desirable that the operating lever has a predetermined terminal position corresponding to said end of the path of movement. This predetermined terminal position may be defined by simple stop means.

The various features of novelty which characterize the invention are pointed out with particularity in the claims annexed to and forming a part of this disclosure. For a better understanding of the invention its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawing:

FIG. 2 is a shematic illustration of a first embodiment of the chain-shifting device incorporating the present invention in a first shifting position and viewed in the direction of the arrow II of FIG. 1;

FIG. 3 shows the chain-shifting device of FIG. 2 in a second shifting position;

FIG. 4 is a schematic illustration of a second embodiment of the chain-shifting device incorporating the present invention shown in a first shifting position again in the direction II of FIG. 1;

FIG. 5 shows the chain-shifting device of FIG. 4 in a second shifting position;

FIG. 6 shows a constructive example of a shifting device of this invention according to the design principles of FIG. 4 in a shifting position corresponding to that one of FIG. 4 and again as viewed in the direction of the arrow II of FIG. 1;

DESCRIPTION OF THE PREFERRED EMBODIMENTS

Figure 1:
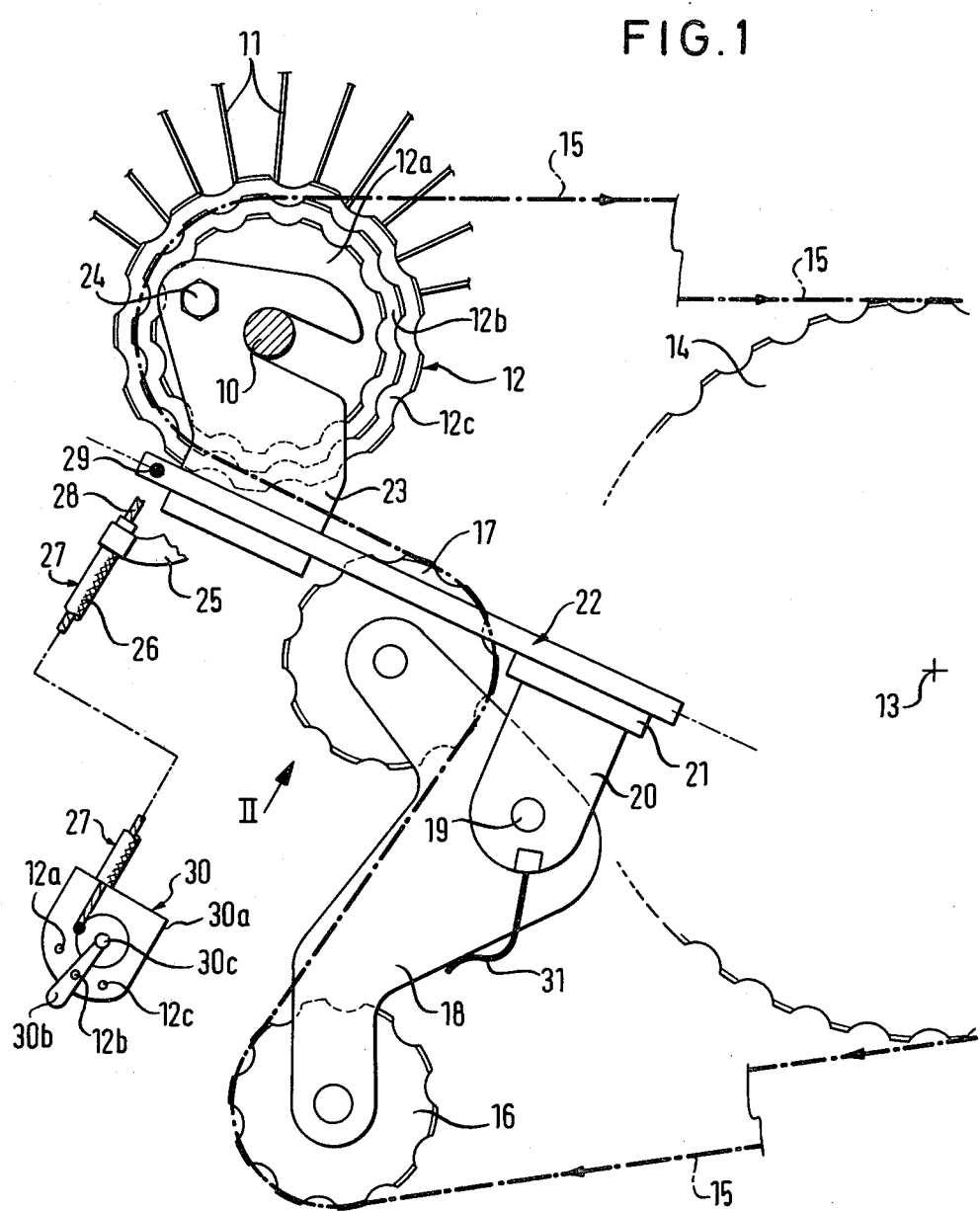
FIG. 1 is a partial side view of a bicycle, illustrating a chain-shifting device embodying the present invention.

Referring now to the drawings, wherein similar parts are identified with like reference characters throughout the various figures thereof, there is shown in FIG. 1 a derailler system in accordance with the invention which is operatively associated with the rear axle 10 of a bicycle wheel 11 represented by the spokes of the wheel. The rear wheel 11 is connected to a sprocket system 12 including a plurality of sprockets 12a–12c arranged concentrically with regard to the rear wheel and connected therewith to enable driving of the wheel at various speeds.

The system includes a conventional drive mechanism including a bicycle pedal bearing 13 upon which a drive sprocket 14 is rotatably mounted on one side of the pedal bearing.

A chain 15 extends from the sprocket 14 toward the sprockets of the sprocket system 12. The chain 15 extends over a tension pinion 16 and over an idler sprocket or wheel 17. The tension pinion 16 and the idler sprocket 17 are rotatably mounted upon a twin-arm tension lever 18 which is arranged under the influence of a tension spring 31. The tension lever 18 is mounted upon a lug 20 and rotatably connected thereto by a swiveling axle 19.

The system of the invention includes a movable support member 21 which supports the lug 20 and which is mounted upon a guide system 22 arranged to lie in a plane extending perpendicular to the plane of the drawing of FIG. 1 and movably guided in the plane perpendicular to FIG. 1. The guide system 22 is supported by a frame-mounted fixed support member 23 which is fastened to the rear axle 10 and which is additionally attached to the bicycle frame by means of a screw 24.

An arm 25 which is fastened to the fixed support member 23 supports and is abutted by a sheath 26 of a Bowden wire 27 which acts upon the guide system 22 at a point 29. The Bowden wire 27 emanates from an adjusting switch 30 and by means of the wire 27 the guide system 22 may be actuated from the adjusting switch 30 in such a manner that the movable support member 21 will be shifted in a direction which is essentially perpendicular to the plane of the drawing in FIG. 1. As a result, the tension pinion 16 and the idler sprocket 17 will be shifted in a direction along the rear axle 10 by the movable support member 21.

Shifting of the idler sprocket 17 along the rear axle 10 will cause transfer of the chain 15 between the individual sprockets 12a–12c of the sprocket system 12. The chain 15 will always shift onto the sprocket which at any time is located essentially in a plane common with the plane of the idler sprocket 17 and extending substantially parallel with the plane of the drawing in FIG. 1.

It is to be noted that the parts 20, 19, 18, 17 and 16 can be regarded as a chain mover unit.

The adjusting switch 30 comprises a switch housing 30a and an operating member 30b. The operating member 30b is rotatable around an axis 30c. The wire 27 is connected to the operating member 30b. The operating member 30b can be positioned into a plurality of switch positions 12a, 12b and 12c corresponding to the various sprockets 12a, 12b, 12c respectively. When the operating member 30b is in the switch position 12a the chain 15 runs over the smallest sprocket 12a and the core 28 of the Bowden wire 27 is in its most released state. When the operating member 30b is in the switch position 12c the chain 15 runs over the largest sprocket 12c and the core 28 of the Bowden wire 27 is in its most tensioned state. Spring means are acting onto the guide system 22 so as to bias the guide system 22 into a position in which the chain 15 runs over the smallest sprocket. The movement of the operating member 30b from the switch position 12a to the switch position 12c is made against the action of these spring means which will be described in more detail in connection with the description of FIGS. 2, 3, 4 and 5. The movement of the operating member 30b from position 12a into position 12c is achieved or assisted by the spring means. In the position 12a and preferably also in the positions 12b and 12c the operating member 30b is fixed with respect to the switch housing 30a, e.g. by engagement of a pin mounted on the operating member 30b into a hole provided in the switch housing 30a at position 12a.

Referring now to the embodiment of FIGS. 2 and 3, one can see again the fixed support member 23 and the movable support member 21. The movable support member 21 is connected to the fixed support member 23 by first and second link members 32 and 34 respectively. The link member 32 is connected by a first pivot joint 32a to the fixed support member 23 and by a second pivot joint 32b to the movable support member 21. The second link member 34 is connected by a third pivot joint 34a to the fixed support member 23 and by a fourth pivot joint 34b to the movable support member 21. The pivot axis of the pivot joints is perpendicular to the plane of the drawing. The tube 26 of the Bowden wire 27 is supported by a tube support member 25 which is pivotally mounted to the fixed support member 23, the pivot axis being again perpendicular to the plane of the drawing. The pivot joint 34b is surrounded by a first torsional spring 36. This first torsional spring 36 has a first end 36a acting onto the movable support member 21 and a second end 36b acting onto the link member 34. The first torsional spring 36 tends to reduce the angle defined by the movable support member 21 and the link member 34 toward the position of FIG. 3 so that under the action of the torsional spring 36 the link member system is biased toward the position as shown in FIG. 3, which position corresponds to the chain 15 running over the smallest sprocket 12a as shown in FIG. 1.

The core 28 of the Bowden wire 27 is connected to a first compensating member in the form of a lever 38. The lever 38 is pivotally mounted around the axis of the pivot joint 34b. A second compensating member 40 also in the form of a lever is also pivotally mounted around the axis of the pivot joint 34b. A clamp roller free-wheel unit 42 is provided between the levers 38 and 40. This free-wheel unit 42 is illustrated by an outer ring member 42a fixed to the lever 38 and an inner ring member 42b fixed to the lever 40. Between the inner and the outer ring members 42b and 42a respectively, there are provided roller members 42c. The rollers may be cylindrical or balls. The clamp roller free-wheel unit 42 is such that the lever 40 can be rotated counterclockwise with respect to the lever 38 but cannot be rotated clockwise with respect to the lever 38. The lever 40 is provided with a rigid extension 40a. This rigid extension 40a engages the end portion 36a of the torsional spring 36 but does not directly engage the movable support member 21.

The position shown in FIG. 2 corresponds to the operating member 30b being positioned in the switch position 12c. The link system 32, 34 is prevented from being moved into the state of FIG. 3 by the core 28 acting onto the movable support member 21 via the free-wheel unit 42, the lever 40 and the extension 40a. When the guide system including the link members 32 and 34 is to be transferred to the position of FIG. 3 the operating member 30b is brought from position 12c to position 12a. This means that the length of the core 28 extending beyond the tube 26 and the tube support 25 is extended as shown in FIG. 3. Therefore, the link members 32, 34 can move from the position of FIG. 2 to the position of FIG. 3 under the action of the torsional spring 36. When the sprockets 12a to 12c are rotating the chain can follow the movement of the idler sprocket 17 so that the chain is transferred from the sprocket 12c to the sprocket 12a. When the sprockets 12a to 12c are not rotating at the moment when the operating member 30b is adjusted from position 12c to position 12a the chain is blocked by the engagement with the sprocket 12c. As a consequence, the link members 32, 34 cannot immediately move from the position of FIG. 2 to the position of FIG. 3 but the core 28 of the Bowden wire 27 is loosened. The link members 32, 34 can move however from the position of FIG. 2 to the position of FIG. 3 when the sprockets 12a to 12c begin to rotate so that the chain 15 can come out of engagement with the sprocket 12c. As a result thereof, one can state that a preselection of the switch position 12a is possible even if the sprockets 12a to 12c are not rotating at the moment of movement of the operating member 30b from position 12c to position 12a.

It is assumed now that the length of the core 28 of the Bowden wire and also of the tube 26 is fully correct and that after the link members 32, 34 have moved into the position shown in FIG. 3 the idler sprocket is in aligned with the sprocket 12a. Under these conditions, the position of the link members 32 and 34 is defined by the core 28 which is still under tension due to the action of the torsional spring 36. So the position of the operating member 30b defines via the Bowden wire 27 the position of the FIG. 3.

It is to be noted that an abutment member 44 is fixed to the link member 34. It is to be noted from FIG. 3 that in the position of FIG. 3 the abutment member 44 has just come into engagement with the end 40b of the lever 40.

When starting from the position as shown in FIG. 3 the guide system is to be transferred again into the position as shown in FIG. 2, the operating member 30b is moved from the position 12a to position 12c. Now the link members are rocked from the position as shown in FIG. 3 to the position as shown in FIG. 2 by the core 28 against the action of the torsional spring 36 which resists to an increase of the angle defined between the link member 34 and the movable support member 21. When the sprockets 12a to 12c are rotating the link members 32, 34 can immediately follow the movement of the operating member 30b from the position 12a to the position 12c. When the chain 15 is however blocked due to a standstill of the sprockets 12a–12c the chain cannot immediately follow and the link members 32, 34 first remain in the position as shown in FIG. 3. As the core 28 is however retracted from the position as shown in FIG. 3 to the position as shown in FIG. 2 the lever 38 is rocked counterclockwise and also the lever 40 with its extension 40a is rocked together with the lever 38 due to the locking action of the free-wheel unit 42. So the extension 40a lifts the end 36a of the torsional spring 36 from the movable support member 21, the inner tension of the torsional spring 36 being increased. Only when the sprockets 12a–12c are rotated again the chain 15 can move from the sprocket 12a to the sprocket 12c. It is to be noted therefore that a preselection with non-rotating sprockets 12a to 12c is also possible when the chain 15 is to be transferred from the sprocket 12a to the sprocket 12c.

Regarding now again the position of FIG. 2, it is assumed that the Bowden wire core 28 has been elongated, e.g. due to a long-term charge resulting from the torsional spring 36. When under such condition the operating member 30b is moved from the position 12c to the position 12a the core 28 after having been fixed in the position 12a defines a position of the link members 32,34 which is somewhat offset to the right as compared to the position shown in FIG. 3, the offset corresponding to the elongation of the core 28. Before however the link members 32, 34 reach such offset position defined by the elongated core the abutment member 44 engages the end 40b of the lever 40 so that the lever 40 is rotated counterclockwise with respect to the lever 38 so that the angle defined between the lever 38 and the lever 40 is increased. The counterclockwise rotation of the lever 40 is permitted by the fact that the extension 40a only engages the spring 36 (and not directly engages the movable support member 21). By the increase of the angle between the levers 38 and 40 the elongation of the core 28 is compensated so that after subsequent switching from the position of FIG. 3 to the position of FIG. 2 and back from the position of FIG. 2 to the position of FIG. 3 the position of the link members 32, 34 is such that the idler sprocket 17 is again in alignment with the corresponding sprocket 12a. it is to be noted that even if a certain friction occurs in the free-wheel unit when the lever 40 is rotated counterclockwise with respect to the lever 38 in the non-locking sense of the free-wheel unit the lever 38 is prevented from following the counterclockwise rotation of the lever 40 due to the stiffness of the section of the core 28 extending between the tube support member 25 and the lever 38.

It is to be noted that a further abutment member 46 is provided on the movable support member 21. This further abutment member 46 also faces the abutment member 44. The abutment member 46 is however dimensioned in such way that it only comes into engagement with the abutment member 44 after the compensating movement of the lever 40 with respect to the lever 38 has been accomplished. The abutment member 46 is not essential for the operation of this device. This abutment member 46 is however desirable so as to define a terminal position of the link members 32, 34, e.g. in case that the core 28 is broken or has been elongated to an unusual extent. It is to be noted that the compensation as described here with respect to FIGS. 2 and 3 becomes also effective when the tube 26 of the Bowden wire 27 is compressed or when other variations of the "effective length" of the transmission means between the operating member 30b and the lever 40 occur.

The embodiment of FIGS. 4 and 5 is based on a different design of a guide system. This design of the guide system is e.g. described in U.S. Pat. No. 4,231,264. Analogous parts are designated by the same reference numerals as in FIGS. 2 and 3, however increased by 100. One can see the fixed support member 123 and the movable support member 121. The fixed and the movable support members are provided with head members 123a and 121a respectively. The head member 123a is connected to the head member 121a by two link members 132 and 134. The link member 132 is connected to the head member 123a and to the head member 121a by a first pivot joint 123a and a second pivot joint 132a respectively. The link member 134 is connected to the head member 123a and to the head member 121a by a third pivot joint 134a and a fourth pivot joint 134b respectively. The link members 132, 134 cross each other and are interconnected by a fifth pivot joint 148. The pivot axes of the pivot joints are perpendicular with respect to the plane of the drawing. The pivot joints 132a and 132b permit in addition to a rotative movement of the respective interconnected parts a translational movement of the interconnected parts as shown by the longitudinal direction of the fork-shaped members.

A torsional spring 136 surrounds the axis of the fifth pivot joint 148 and engages by its first end 136a the link member 132 and by its second end 136b the link member 134. The action of the torsional spring 136 is such as to bias the link members 132, 134 to the position as shown in FIG. 5. The core 128 of the Bowden wire 127 is connected to a lever 138 acting as a compensating member. The lever 138 is pivotally mounted about the axis of pivot joint 148. The lever 140 is also pivotally mounted about the axis of the pivot joint 148. The levers 138, 140 are interconnected by a clamp roller free-wheel unit 142. This free-wheel unit comprises an outer ring member 142a to which the lever 138 is fixed and an inner ring member 142b to which the lever 140 is fixed. Further the free-wheel unit comprises roller members 142c of usual design which may either by cylindrical or balls. The design of the free-wheel unit is such that the lever 140 cannot be rotated with respect to the lever 138 in counterclockwise direction but can be rotated with respect to the lever 138 in clockwise direction. The lever 140 engages both the link member 134 and the end 136b of the torsional spring 136. The position as shown in FIG. 4 corresponds to the operating member 30b being positioned in position 12c. In this position the link members 132, 134 are maintained by the core 128 of the Bowden wire 127, the free-wheel unit being locked. In the position of FIG. 4 the idler sprocket 117 is in alignment with the largest sprocket 12c.

When the operating member 30b is released from the position 12c the link members 132, 134 are moved into the position as shown in FIG. 5 in which the idler sprocket 117 is in alignment with the smallest sprocket 12a, this movement being accomplished by the torsional spring 136, the core 128 being pulled into the extended position as shown in FIG. 5. The position of FIG. 5 is defined by the core 28 whose position is again defined by the operating member 30b being positioned in the position 12a. When the chain 15 is blocked by the non-rotating sprocket unit 12 the operating member 30b can nevertheless be brought from the position 12c to the position 12a with the result of loosening the core 128 in the section between the tube support member 125 and the lever 138. The link members 132, 134 can however follow the loosened core 128 only when the sprocket unit 12 begins to rotate again.

As can be seen from FIGS. 4 and 5, a connection member 150 is pivotally mounted in the pivot joint 134b. This connection member comprises two arms 150a and 150b. The arm 150a is an abutment member cooperating with a further abutment member 144. The other arm of the connection member 150 is provided with a hook 150c at its free end. This hook 150c engages an extension 140c of the lever 140, the extension 140c being rigidly connected to the lever 140. As can be seen from FIG. 5, the abutment members 150a and 144 have come into engagement in the position of FIG. 5. Simultaneously the hook 150c is in engagement with the extension 140c.

When the guide system is to be brought from the position of FIG. 5 back into the position of FIG. 4 the operating member 30b is moved from the position 12a to the position 12c. When the sprocket unit 12 rotates the link members 132, 134 can immediately follow the core 128 and the levers 138, 140 which are locked with respect to each other by the free-wheel unit 142. When the transfer of the chain 15 from the sprocket 12a to the sprocket 12c is blocked by a standstill of the sprocket unit the lever 138 and concurrently the lever 140 are rocked against the action of the torsional spring 136, the end 136b of the torsional spring being lifted from the link member 134 by the lever 140. It is to be noted that a preselection of the speed is always possible even when the sprocket unit 12 is at a standstill.

It is assumed now that the guide system of FIG. 5 is moved to the position of FIG. 4 and hereupon back from the position of FIG. 4 to the position of FIG. 5. It is further assumed that during this movement the core 128 is elongated. This means that the idler sprocket 117 is moved to a position offset to the right with respect to the position as shown in FIG. 5 before the link members 134, 132 are positioned in their terminal position by the core 128. However, before the idler sprocket 117 moves beyond the position as shown in FIG. 5 the abutment member 150a engages the abutment member 144 so that the connection member 150 is rocked clockwise. This clockwise movement is transmitted to the extension 140c and the lever 140 so that the lever 140 is moved clockwise with respect to the lever 138, this clockwise movement being admitted by the free-wheel unit 142. The lever 138 cannot follow such clockwise movement of the lever 140 even if some friction occurs in the free-wheel unit in the releasing direction, because the lever 138 is supported by the stiffness of the core 128. So when the link members 132, 134 arrive at their terminal position defined by the elongated length of the core 128 the angle between the lever 138 and the lever 140 has been reduced and this reduction of the angle results in a compensation of the elongation of the core 128. As a result thereof, when the system of FIG. 5 is again brought to the position of FIG. 4 and hereupon once more brought to the position of FIG. 5 the idler sprocket 117 will again be correctly positioned in the position as shown in FIG. 5 and be in alignment with the sprocket 12a. It is to be noted also with respect to this embodiment that the compensation as described above also occurs when the effective length of the transmission means between the operating member 30b and the lever 140 is changed otherwise, e.g. by a compression of the tube 26. It is to be noted that the abutment member 144 is an adjustable abutment member which is defined e.g. by a set screw.

FIGS. 4 and 5 show in addition an abutment member 146. This further abutment member 146 is not a necessary feature of this invention. It comes into engagement with the abutment members 150a and/or 144 only when an elongation of the core 128 has occurred and the abutment member 150a has already come into engagement with the abutment member 144.

As mentioned above, the situation may arise that when switching from the position of FIG. 4 to the position of FIG. 5 the sprocket unit 12 is at a standstill and the link members 132, 134 cannot immediately follow the extension of the core 128. In such case the lever 138 would be freely movable counterclockwise towards the lever 140 so that the correct angle between the levers 138 and 140 would be lost. For preventing this situation there is provided a tension spring 152 which tends to turn the lever 140 counterclockwise so that the free-wheel unit 142 always remains locked in such situation.

The embodiment of FIGS. 6 to 10 is based on the design principle of the embodiment as diagrammatically shown in FIGS. 4 and 5. Analogous parts are designated by the same reference numerals, however increased by 100.

Also the function of the embodiment according to FIGS. 6 to 10 is identic with the embodiment as shown and described with respect to FIGS. 4 and 5.

FIG. 6 shows in more detail the free-wheel unit 242. This free-wheel unit 242 comprises a single roller member 242c. The roller member 242c is accommodated between a circular path 242d of the inner ring member 242b and an inclined inner surface 242e of the outer ring member 242a. There is further provided an elastic member 254 which tends to maintain the roller member 242c in continuous engagement with the circular path 242d and the inclined inner surface 242e. FIG. 6 corresponds to the position of FIG. 5.

Figure 7:
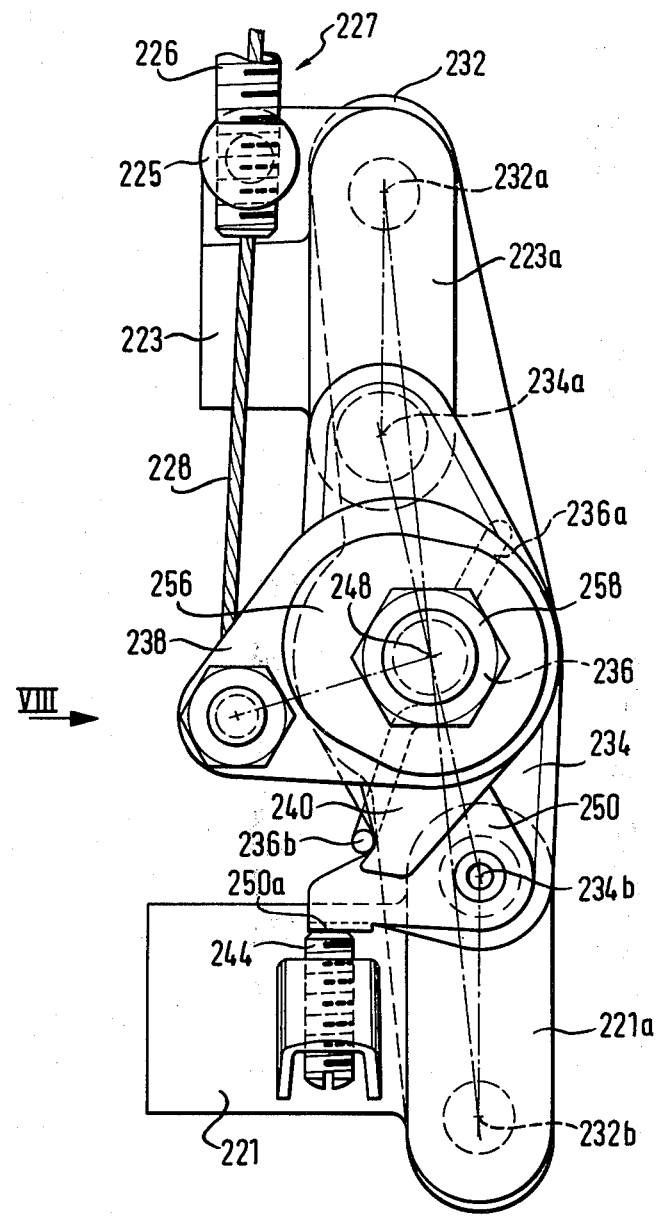
FIG. 7 shows the shifting device of FIG. 6 in a shifting position corresponding to that one of FIG. 5.

FIG. 7 corresponds to the position of FIG. 5. FIG. 7 additionally shows a cover disc 256 covering the free-wheel unit and secured by a nut 258.

Figure 8:
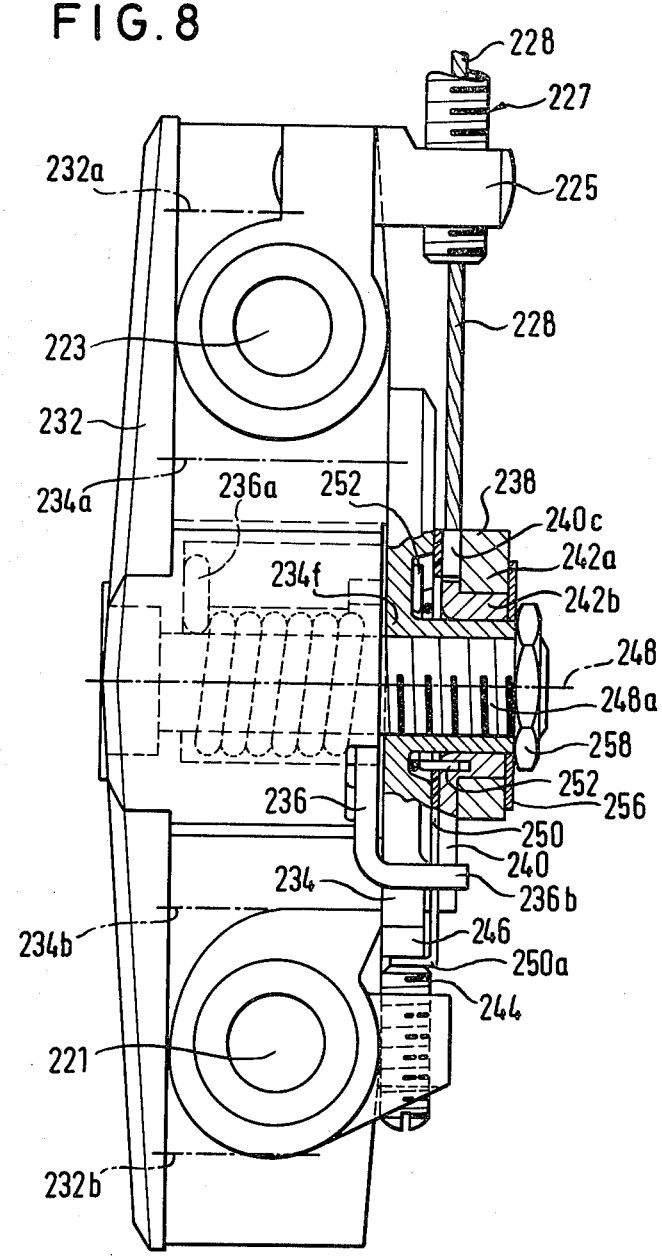
FIG. 8 shows the shifting device of FIGS. 6 and 7 as regarded in the direction of the arrow VIII of FIG. 7 with some parts broken away.

FIG. 8 additionally shows that the fifth pivot joint 248 comprises a bolt 248a. On this bolt 248a there is rotatably mounted an annular flange 234f of the link member 234. On this annular flange 234f there is rotatably mounted the inner ring member 242b connected to the lever 240 and on the inner ring member 242b there is rotatably mounted the outer ring member 242a connected to the lever 238. Further, FIG. 8 shows the torsional spring 252 corresponding in its function to the tension spring 152 of FIGS. 4 and 5. This torsional spring 252 is mounted in a recess of the link member 234 and is connected by its one end to the lever 240 and by its other end to the link member 234.

Figure 9:
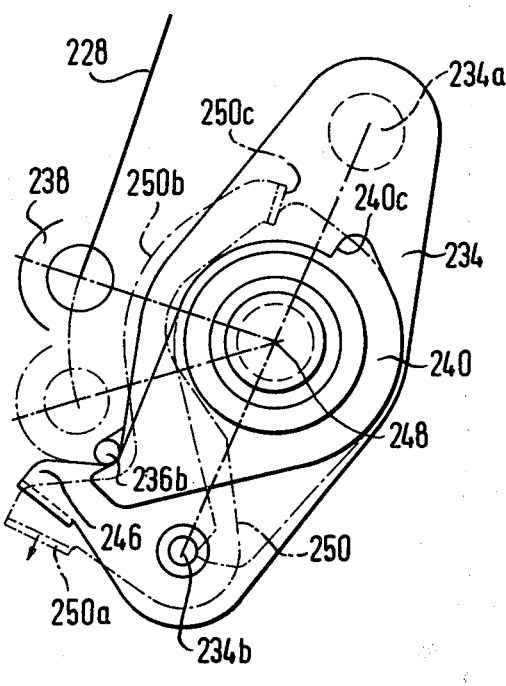
FIG. 9 shows a detail of the shifting device of FIGS. 6 to 8 as viewed in the same direction as in FIG. 6 in a first shifting position corresponding to that one of FIG. 4.

FIG. 9 shows a detail of FIG. 6. In this FIG. 9 the position corresponding to FIG. 6 is illustrated in full lines, whereas an intermediate position is illustrated in dotted lines.

Figure 10:
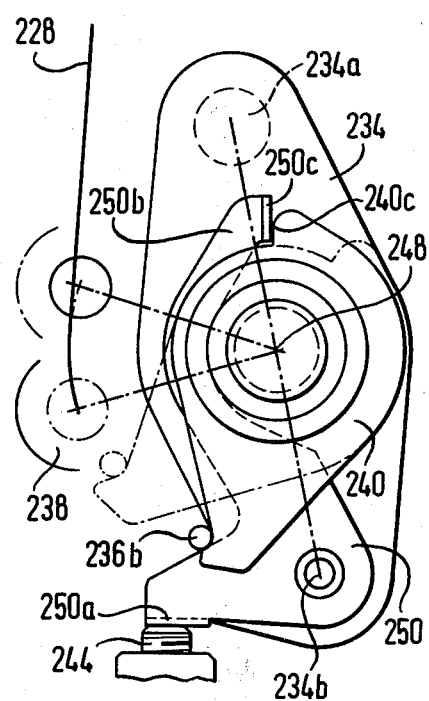
FIG. 10 shows the detail as seen in FIG. 9 in a second shifting position corresponding to that one of FIG. 5.

FIG. 10 shows the same detail of FIG. 9 in the position of FIG. 7; the dotted line in FIG. 10 corresponds to the position of FIG. 9.

Figure 11:
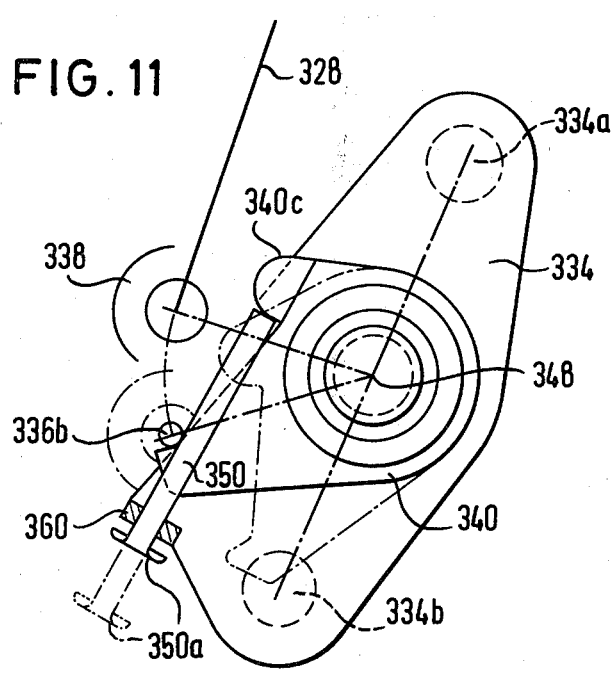
FIG. 11 shows an alternative embodiment of the detail as shown in FIG. 9 in the same position as shown in FIG. 9.

The design of the connection member 250 in the embodiment of FIGS. 6 to 10 is somewhat different from the design of the connection members in FIGS. 3 and 4, the function is the same, however, The embodiment of FIG. 11 differs from the embodiment of FIGS. 6 to 10 only by a different design of the connection member 350. This connection member 350 is shaped as a sliding pin which is slidingly guided in a guiding block 360 fixed to the link member 334. The abutment member 350a is provided at one end of the sliding pin 350, whereas the other end of the sliding pin 350 cooperates with the extension 340c of the lever 340. The function of the embodiment of FIG. 11 is also identic with the function of the embodiments of FIGS. 4 and 5. FIG. 11 shows in full lines a position corresponding to the position in FIGS. 4 and 9 and in dotted lines an intermediate position.

While specific embodiments of the invention have been shown and described in detail to illustrate the application of the inventive principles, it will be understood that the invention may be embodied otherwise without departing from such principles.

The reference numerals are only for an easier understanding. They are not to be understood in a restrictive sense.

What is claimed is:

1. In a chain-shifting device for a bicycle or the like comprising a chain mover unit (17), a movable support member (21) supporting said chain mover unit (17), a fixed support member (23) to be attached to the frame of the bicycle, guide means (32, 34) supported on said fixed support member (23), said movable support member (21) being guided by said guide means (32, 34) from movement along a path of movement, first spring means (36) biasing said movable support member (21) towards one end of said path of movement (FIG. 3), an adjusting switch (30) including a switch housing (30a) and an operating member (30b) to be attached to a part of the bicycle, said operating member (30b) having a plurality of switch positions (12a–12c) with respect to said switch housing (30a), a terminal one (12a) of said switch positions (12a–12c) corresponding to said end of said path of movement and being defined by switch stop means, transmission means (27, 38, 40, 40a) extending between said operating member (30b) and said movable support member (21) for positioning said movable support member (21) along said path of movement by said operating member (30b) against the action of said first spring means (36), said transmission means (27, 38, 40, 40a) comprising a pulling member (28) and automatic compensating means for compensating for a change of the effective length of said transmission means so as to readjust in operation a predetermined position of said mover unit (17) when said operating member is in said terminal position (12a) and when a change of the effective length of the transmission means (27, 38, 40, 40a) has occurred, the improvement which consists in that said compensating means comprises a first compensating member (38) and a second compensating member (40) connected to a first section (28) and a second section (40a) of said transmission means respectively and rotatably mounted with respect to each other about an axis of rotation (34 b), a clamp roller free-wheel unit (42) being provided between said first and second compensating members (38, 40) such as to lock said compensating members (38, 40) with respect to each other in a first relative rotational direction for allowing transmission of a pulling force through said transmission means (27, 38, 40, 40a) and to allow relative rotation of said compensating members (38, 40) in a second rotational direction for compensating for a change of the effective length of said transmission means (27, 38, 40, 40a), and that a first abutment member (40b) is operationally connected to one (40) of said compensating members (38, 40) and a second abutment member (44) is operationally connected to a part (34) of said device which is movable with respect to said one compensating member (40) during movement of said movable support member (21) along said path of movement such that said abutment members (40b, 44) engage each other when said movable support member (21) approaches said one end of said path of movement, such engagement effecting relative rotation of said compensating members (38, 40) in said second rotational sense when a change of the effective length of said transmission means 27, 38, 40, 40a) has occurred.

2. A chain-shifting device as set forth in claim 1, wherein said transmission means (27, 38, 40, 40a) comprise a Bowden cable (27).

3. A chain-shifting device as set forth in claim 1, wherein said compensating means (38, 40) are located adjacent said guide means (32, 34).

4. A chain-shifting device as set forth in claim 1, in which said operating member (30b) is movable to different switch positions (12a, 12b, 12c) even when said chain mover (117) is blocked by a non-rotating chain (15) and said transmission means (128, 138, 140) are released from the spring force of said first spring means (136) on such movement of said operating member (30b) second spring means (152) being provided for maintaining said compensating members (138, 140) in locked condition with respect to each other, the force of said second spring means (152) being smaller than the force of said first spring means (136).

5. A chain-shifting device as set forth in claim 1, further comprising terminal abutment means (44, 46) provided on parts (34, 21) of said device, which are movable with respect to each other during said path of movement of said movable supporting member (21), said terminal abutment means (44, 46) coming into mutual engagement only after said operating member (30b) has arrived in said terminal position (12a) defined by said switch stop means and a change of the effective length of said transmission means (27, 38, 40, 40a) has occurred but only after said first abutment member (40b) and said second abutment member (44) have come into mutual engagement.

6. A chain-shifting device as set forth in claim 1, wherein said guide means comprise a plurality of link members (21, 23, 32, 34) which are movably interconnected by pivot joints (32a, 34a, 32b, 34b), said rotational axis of said compensating members (38, 40) coinciding with the axis of one (34b) of said pivot joints.

7. A chain-shifting device as set forth in claim 6, wherein said first spring means (36) comprise a torsional spring surrounding said one (34b) of said pivot joints and acting onto the link members (21, 34) connected by said one (34b) of said pivot joints.

8. A chain-shifting device as set forth in claim 6, wherein said link members (21, 23, 32, 34) comprise a first link member (32) being connected to said fixed support member (23) by a first pivot joint (32a) and to said movable support member (21) by a second pivot joint (32b) and a second link member (34) being connected to said fixed support member (23) by a third pivot joint (34a) and to said movable support member (21) by a fourth pivot joint (34b), said first and second link members (32, 34) being substantially parallel to each other.

9. A chain-shifting device as set forth in claim 1, wherein said guide means comprise a first link member (132) being connected by a first pivot joint (132a) to said fixed support member (123) and by a second pivot joint (132b) to said movable support member (121) and a second link member (134) being connected to said fixed support member (123) by a third pivot joint (134a) and to said movable support member (121) by a fourth pivot joint (134b), said first and second link members (132, 134) crossing each other and being interconnected in the crossing areas by a fifth pivot joint (148), two (132a, 132b) of said first, second, third, fourth and fifth pivot joints allowing also translational movement of the respective link members (132, 134, 123a, 121a) connected by said two pivot joints (132a, 132b).

10. A chain-shifting device as set forth in claim 9, wherein said rotational axis of said compensating members (138, 140) coincides with said axis of said fifth pivot joint (148).

11. A chain-shifting device as set forth in claim 10, wherein said first abutment member (150a) is supported by a connection member (150) which is pivotally mounted on one (134b) of said first, second, third and fourth pivot joints and is provided with an extension (150c) engaging said one (140) of said compensating members (138, 140).

12. A chain-shifting device as set forth in claim 10, wherein said first abutment member (350a) is supported by one end of a sliding rod (350) which is slidably mounted in one (334) of said first and second link members and engaging said one (340) of said compensating members by its other end.

13. A chain-shifting device as set forth in claim 1, wherein said one (40) of said first and second compensating members (38, 40), which is connected to said first abutment member (40b) is connected to that one (40a) of said first and second sections of said transmission means (27, 38, 40, 40a) which extends between said movable support member (21).

* * * * *